No. 638,053. Patented Nov. 28, 1899.
A. W. HOLLIDAY.
NUT LOCK.
(Application filed July 6, 1899.)
(No Model.)

Witnesses
Harry L. Ames
K. A. Nau

Inventor
A. W. Holliday
By V. D. Stockbridge
Nie Attorney

UNITED STATES PATENT OFFICE.

AYRES W. HOLLIDAY, OF LEXINGTON, MISSISSIPPI.

NUT-LOCK.

SPECIFICATION forming part of Letters Patent No. 638,053, dated November 28, 1899.

Application filed July 6, 1899. Serial No. 722,960. (No model.)

*To all whom it may concern:*

Be it known that I, AYRES W. HOLLIDAY, a citizen of the United States, residing at Lexington, in the county of Holmes and State of Mississippi, have invented a certain new and useful Nut-Lock, of which the following is a specification, reference being had therein to the accompanying drawings.

The invention relates to that class of nut-locks especially adapted for use in connection with railroad-rails and fish-plates in which a through-bolt is employed provided with a reduced and screw-threaded point end, the body of the bolt adjacent to said reduced end being provided also with a reverse screw-thread, one being a right-hand and the other a left-hand screw-thread and with correspondingly-threaded nuts adjustable upon said end, said nuts being provided with a box or casing surrounding them and preventing relative rotation.

The object is to provide a nut-lock which will effectually prevent the rotation of the nuts when the bolt is in use.

The invention consists in certain details of construction and arrangement of the bolts and casing in connection with spring-clamps for effectually locking the nuts in place, and will be understood from the following description and claim.

Figure 1:
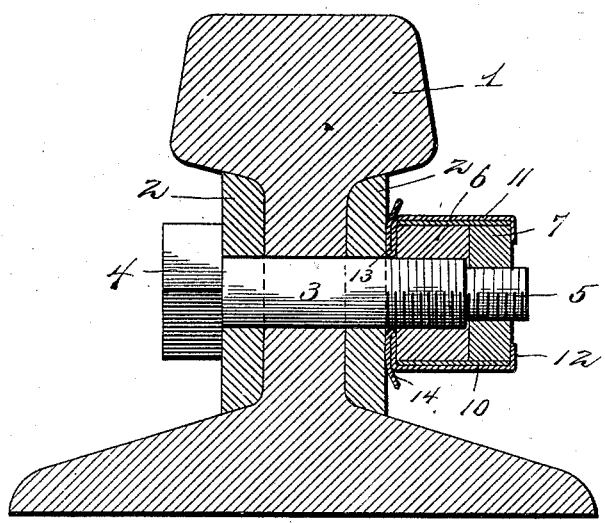
Figure 2:
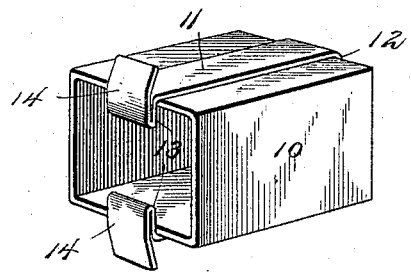
Figure 3:
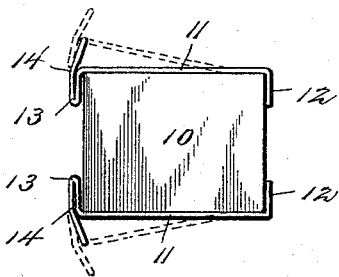
Figure 4:
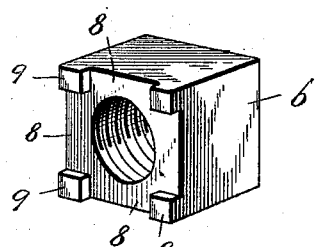

In the accompanying drawings, Figure 1 represents a vertical transverse section through a railroad-rail and fish-plates upon opposite sides thereof, showing a through-bolt in elevation, with the adjusting-nuts and the casing therefor in section. Fig. 2 is a perspective view of the nut-casing and of the spring-clamps secured thereto. Fig. 3 is a side elevation of the same, showing in dotted lines the spring-clamps raised for releasing the casing from the inner clamping-nut. Fig. 4 is a perspective view of the inner nut, showing the inner recessed face thereof.

In the several figures the reference-numerals wherever used indicate the same parts.

1 indicates a rail; 2, the opposing fish-plates; 3, the through-bolt for clamping said plates to the rail; 4, the head of the bolt, and 5 the reduced end or point of the bolt. The end of the bolt adjacent to said reduced portion is provided, preferably, with right-hand screw-threads and the reduced portion with left-hand screw-threads, though this arrangement of the threads may be reversed, if desired.

6 indicates the inner nut, screwed upon the right-hand threaded portion of the bolt, and 7 the outer or jam nut, provided with a left-hand screw-thread and engaging the reduced point of the nut, said nut being adjustable on the bolt for the purpose of clamping the fish-plates in place. The inner end or face of the nut 6 is recessed, as indicated at 8, leaving corner projections 9, the recesses extending from opposite sides entirely across the inner face of the nut, as shown in Fig. 4.

10 indicates the nut-casing, shown in the present instance rectangular in form, conforming to the shape of the nut shown; but it will be apparent that the casing may be made hexagonal or octagonal in form to conform to the shape of the nuts employed. To the opposite sides of this casing are secured springs 11, which at their outer ends are turned inward toward each other, as indicated at 12, to form stops adapted to rest against the outer face of the outer nut when the casing is in place, and thereby prevent inward movement of the casing. The spring is fastened to the outer end of the casing in any suitable manner, its inner end being left free and provided with an inturned hook 13, adapted to enter the recess 8 in the inner face of the nut 6. The hook or clamp 13 is rebent upon itself, as indicated at 14, forming an arm which extends outward beyond the outer face of the spring 11, adapting the ends of the springs to be forced outward for releasing the clamps from the nut when it is desired to withdraw the casing. These extensions 14 may be of any suitable shape, adapting them to be readily grasped for the purpose stated. As shown in Fig. 1, the rebent arm 14 of the spring when the nuts are crowded into place against the fish-plates will be pressed against said fish-plates in such manner as to crowd the clamping-arm 13 firmly into the recess 8 in the nut, thereby preventing their accidental disengagement from the nut, and it will be apparent that the casing can only be withdrawn after the clamps 13 have been disengaged from the nut in such manner as to allow the casing to be moved outward over the faces of the inclosed nuts.

By the construction described a simple and effective nut-lock is provided, one which is securely guarded against accidental displacement and one also which can be readily removed by hand when such removal is required. As stated, the form of the casing will conform to that of the nuts employed, whether square or many-sided. Preferably two clamps will be employed, arranged upon opposite sides of the casing, but a single clamp may be found sufficient to effectually guard the nuts against accidental movement and the casing against accidental displacement.

Having thus described the invention, what is claimed, and sought to be secured by Letters Patent, is—

The combination with a bolt having right and left hand threads on its point end and correspondingly-threaded nuts adjustable on said end, the inner nut having its inner face recessed, of a box casing or keeper, spring-clamps secured to and carried by said casing and having inturned hooks on their inner ends adapted to engage the recessed inner face of the nut, said hooks being provided with return arms, for the purpose and substantially as described.

In testimony whereof I affix my signature in presence of two witnesses.

AYRES W. HOLLIDAY.

Witnesses:
M. M. RAYNER,
J. E. CUNNINGHAM.